United States Patent [19]
Neigel et al.

[11] Patent Number: 5,629,416
[45] Date of Patent: May 13, 1997

[54] METHOD OF PREPARING CROSSLINKED STARCH ESTERS

[75] Inventors: Dennis Neigel, Salisbury; Lawrence J. Scotchie, Charlotte, both of N.C.; Martin M. Tessler, Edison, N.J.

[73] Assignee: National Starch and Chemical Investment Holding Corporation, Wilmington, Del.

[21] Appl. No.: 414,556

[22] Filed: Mar. 31, 1995

[51] Int. Cl.$^6$ .................... C08B 31/00; C08B 33/00; C08B 35/00
[52] U.S. Cl. .................... 536/106; 536/102; 536/107; 536/110
[58] Field of Search .................... 536/102, 106, 536/107, 110

[56] References Cited

U.S. PATENT DOCUMENTS

| | | | |
|---|---|---|---|
| 2,399,455 | 4/1946 | Treadway. | |
| 3,553,196 | 1/1971 | Mark et al. | 536/110 |
| 3,795,670 | 3/1974 | Mark et al. | |
| 3,839,320 | 10/1974 | Bauer | 536/110 |
| 4,011,392 | 3/1977 | Rudolph et al. | 536/110 |
| 4,061,611 | 12/1977 | Glowaky et al. | 536/107 |
| 4,100,342 | 7/1978 | Finley | 536/103 |
| 4,501,888 | 2/1985 | Schmidt | 536/110 |
| 5,138,006 | 8/1992 | Cook et al. | 527/301 |

OTHER PUBLICATIONS

A. M. Mark et al., "Acetylation of High–Amylose Corn Starch", Die Starke 22, (1970) pp. 108–111.
C. A. Burkhard et al., "Derivatives of Starch", Rayon Textile Monthly, Jun. 1942, pp. 58–61.
L. H. Kruger et al., "Production and Uses of Starch Acetates", Starch: Chemistry and Technology, vol. 11, 1967, pp. 369–382.

*Primary Examiner*—Nathan M. Nutter
*Attorney, Agent, or Firm*—Eugene Zagarella, Jr.

[57] ABSTRACT

A process for preparing biodegradable, high humidity resistant crosslinked starch esters comprising reacting starch with monocarboxylic acid anhydride in a caustic catalyzed system to a DS of about 1.3 to 2.7 and crosslinking the starch ester in the same reaction mixture with polyfunctional acid and/or anhydride.

19 Claims, No Drawings

METHOD OF PREPARING CROSSLINKED STARCH ESTERS

BACKGROUND OF THE INVENTION

This invention relates to a method for preparing crosslinked, high DS starch esters that exhibit a high rate of biodegradability and improved high humidity resistance.

Processes for manufacturing starch esters including those with high degrees of substitution have been known for many years. As reported in Rayon Textile Monthly, Vol. 23, Jun., 1942, in an article by C. Burkhard and E. Degering entitled "Derivatives of Starch", starch acetates were first prepared in 1869 by heating starch with acetic anhydride and acetic anhydride containing 10 to 15 percent of acetic acid. The same article further describes the acetylation of starch in mixtures of acetic acid and acetic anhydride using various acid catalysts. In 1946, R. Treadway was issued U.S. Pat. No. 2,399,455 which describes the manufacture of starch acetates using specific ratios of acetic anhydride and acetic acid and mineral acid catalysis. However, the use of mineral acids to catalyze starch esterification generally leads to unavoidable depolymerization of the starch polymer and associated strength reduction in application. A recent patent publication to P. Cook et al., U.S. Pat. No. 5,138,006 issued Aug. 11, 1992, describes the preactivation of starch using acetic acid prior to acid catalyzed acetylation. While this technique significantly lowers reaction temperature and time, substantial molecular weight reduction still occurs and the process is expensive.

An improved process for the manufacture of starch triacetates was described in U.S. Pat. No. 3,795,670 issued on Mar. 5, 1974 to A. Mark and C. Mehltretter. In this patent, mineral acid catalysis is replaced by concentrated sodium hydroxide that serves a dual role of both preactivation and catalysis. Starch triacetates produced by this method retain up to 95% of their original molecular weight and are good film and fiber formers. However, starch triacetates (DS of 3.0) demonstrate a poor high humidity resistance and resultant loss in strength in molded structural composites such as disposable cutlery. Thus, there is a need for an improved process for the manufacture of high DS starch esters that exhibit a high rate of biodegradability and improved high humidity resistance.

SUMMARY OF THE INVENTIONS

In accordance with this invention, an improved process has been found for the manufacture of biodegradable high humidity resistant starch esters comprising reacting starch with monocarboxylic acid anhydride in a caustic catalyzed system to a DS of about 1.3 to 2.7 and crosslinking the starch ester in the same reaction mixture with polyfunctional acids and/or anhydrides. The resultant crosslinked starch esters, after purification and isolation, demonstrate an acceptable rate of biodegradability and improved strength when molded into structural items and equilibrated at 90% relative humidity.

DETAILED DESCRIPTION OF THE INVENTION

The crosslinked high DS starch esters prepared by the method of this invention may use any of several starches, native, converted or derivatized as the base starch material. Such starches include those derived from any plant source including corn, potato, wheat, rice, sago, tapioca, waxy maize, sorghum and high amylose starch such as high amylose corn, i.e., starch having at least 40%, and more particularly at least 65%, amylose content by weight. Starch flours may also be used. Also included are the conversion products derived from any of the former bases, such as dextrins prepared by hydrolytic action of acid and/or heat; fluidity or thin boiling starches prepared by enzyme conversion or mild acid hydrolysis; oxidized starches prepared by treatment with oxidants such as sodium hypochlorite and derivatized starches, such as cationic, anionic, amphoteric, non-ionic, and crosslinked starches. The starch should contain a moisture content of about 7 to 14% by weight based on the dry weight of starch. Moisture content higher than 14% can be used but will require more anhydride due to the predominant hydrolysis reaction between the anhydride and water in the system. Moisture contents below 7% demonstrate retarded esterification rates when esterified according to the parameters of this invention and should be avoided. The preferred starch moisture content is about 8 to 11%.

The selected starch base material is mixed with a suitable monocarboxylic acid anhydride to form a slurry at room temperature. Agitation is provided as needed to insure maintenance of a uniform suspension. The monocarboxylic acid anhydride is selected from anhydrides having carboxylic groups of 2 to 4 carbon atoms such as acetic anhydride, propionic anhydride and butyric anhydride as well as mixtures of such anhydrides. The amount of anhydride that is used will depend on the desired degree of ester substitution as well as the moisture content of the starch and the amount of catalyst. The anhydride in the system will preferentially react with the catalyst and the total moisture content from all sources (i.e., water in starch, water in catalyst and water of neutralization of catalyst) prior to being available for esterification of the starch. Extra anhydride must be added to compensate for these side reactions. Generally, the amount of anhydride used will range from about 1.5 to 3.0 parts by weight per part of starch.

The starch esters will have a DS or degree of substitution of about 1.3 to 2.7 and preferably from about 1.5 to 2.4. Starch esters having a DS of less than 1.3 are difficult to isolate and purify while those having a high DS that approaches 3.0 will have severely retarded biodegradability. The term "degree of substitution" or "DS" as used herein indicates the average number of sites per anhydroglucose unit of the starch molecule in which there are substituent groups.

Once the slurry of starch in the monoanhydride is made, a polyfunctional carboxylic acid or anhydride is added to the slurry. The function of the polyfunctional acid or anhydride in the system is to crosslink a small percentage of the starch polymer chains, effectively increasing the average molecular weight of the product. It is believed that the mechanism of crosslinking of dicarboxylic acids proceeds through the formation of a linear mixed anhydride as shown below:

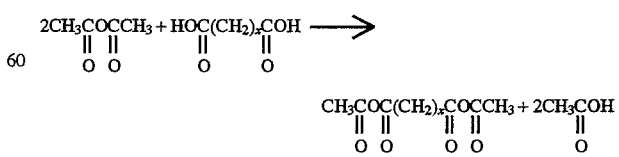

The polycarboxylic acids will have the following general formulas:

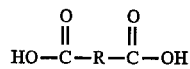

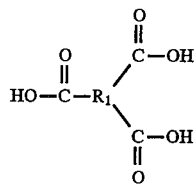

wherein R is selected from the group consisting of alkylene, unsaturated alkylene, bis alkylene ether, cycloalkylene and arylene; $R^1$ is selected from the group consisting of trivalent paraffin radicals, and trivalent aromatic hydrocarbon radicals. The terms alkylene, arylene, paraffin and aromatic hydrocarbons as used herein are intended to include substituted groups such as hydrocarbons (e.g., alkyl groups) as well as substituents such as halogens, halocarbons, nitro and ether or oxygen groups (e.g., oxyalkylene). R contains between 1 and 42 carbon atoms and $R_1$ contains between 6 and 20 carbon atoms. Particularly useful polycarboxylic acids are those of structure I where R is alkylene of 2 to 14 carbon atoms.

Examples of polycarboxylic acids of structure I which are useful are malonic acid, succinic acid, glutaric acid, adipic acid, pimelic acid, oleic acid dimer, sebacic acid, suberic acid, azelaic acid, fumaric acid, 2,5-dimethyl adipic acid, cis-cyclohexane-1,2-dicarboxylic acid, trans-bicyclo [2.2.2] octane-2,3-dicarboxylic acid, trans-bicyclo [2.2.2] oct-5-ene-2,3-dicarboxylic acid, 1,14-tetradecanedicarboxy acid, 1,10-decanedicarboxylic acid, diglycolic acid, 3,3'-oxydipropionic acid, biphenyl-4,4'-dicarboxylic acid, terephthalic acid, 2-bromobenzene-1,4-dicarboxylic acid, 2-chlorobenzene-1,4-dicarboxylic acid, isophthalic acid, naphthalene-1,4-dicarboxylic acid, naphthalene-1,5-dicarboxylic acid, nitroterephthalic acid, methylterephthalic acid, 1,3,5-hexatriene-1,6-dicarboxylic acid, and p-phenylenedipropionic acid.

Examples of polycarboxylic acids of structure II which are useful are: pentane-1,3,5-tricarboxylic acid, benzene-1,3,5-tricarboxylic acid and citric acid.

It is noted that additional compounds analogous to compounds of structure II but having more than three carboxylic acid groups attached to $R_1$ may also be used to prepare the crosslinked starches of this invention.

Crosslinking with polyfunctional anhydrides proceeds through direct reaction between the starch hydroxyl and the anhydride forming a half ester/half acid. The general structure of polyfunctional anhydrides useful in this invention are bis (phthalic anhydrides) having the following general formula:

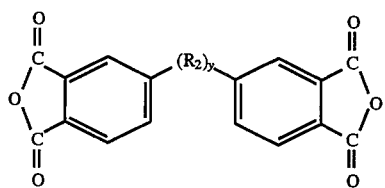

wherein $R_2$ is a divalent organic group, —O—, —S—, $SO_2$, or

and y is 0 or 1. The divalent organic group is selected from the group consisting of alkylene, unsaturated alkylene, bis alkylene ether, cycloalkylene and arylene and contains between 1 and 12 carbon atoms. The terms alkylene and arylene as used herein are intended to include substituted groups such as hydrocarbons (e.g., alkyl groups) as well as substituents such as halogens, halocarbons, nitro and ether or oxygen groups (e.g., oxyalkylene). Examples of polyfunctional anhydrides of structure III which are useful are benzophenone tetracarboxylic acid dianhydride, hexafluoroisopropyl bis (phthalic anhydride), sulfide bis phthalic anhydride, and biphenyl dianhydride.

Pyromellitic dianhydride can also be used to prepare the cross-linked starches of this invention. It is further noted that mixtures of the polycarboxylic acid and anhydrides as discussed above may be used.

The polycarboxylic acid or anhydride crosslinker is preferably added directly to the slurry of starch in monoanhydride at room temperature. If a polyfunctional carboxylic anhydride is being used, it can be added at any time, i.e., before, during or after the esterification takes place. However, when a polyfunctional acid is used, it must be added when there is sufficient monohydride present to form a mixed anhydride. This will vary depending on the rate of reaction and structure of polyfunctional acid and monoanhydride. Thus, the polyfunctional acid can be added to the slurry before heating and during heating, including the beginning of the boiling phase of the process when some monoanhydride will be present.

The amount of polycarboxylic acid or anhydride crosslinker used depends upon the amount of desired crosslinking and typically will range from about 0.001 to 5% by weight based on the dry weight of starch. Amounts greater than 5% can lead to problems with mixability once the starch is esterified and are best avoided.

After the polyfunctional crosslinker is added to the starch slurry, the system is catalyzed or activated by addition of concentrated aqueous caustic solution. The caustic solution can be either sodium hydroxide or potassium hydroxide. The concentration of the aqueous caustic solution can vary but about 45 to 55% is generally the desired range of concentration. The amount of caustic used to activate the system can also vary but generally about 3 to 10% by weight of caustic (dry basis) based on weight of starch is a useful amount.

The amount of time taken to add the caustic solution depends upon the ability of the system to control the temperature of the slurry in the prescribed range. The addition of the caustic solution is quite exothermic, both during and after the addition is made. Typically the caustic add will be started at a slurry temperature of about 20° to 30° C. and finish at a slurry temperature of about 40° to 50° C. The time of addition is generally accomplished over a period of from 5 to 60 minutes.

After the caustic addition, a slurry activation period is observed. A period of from about 30 to 60 minutes has been found suitable for activation with shorter and longer times being found inefficient and resulting in retarded esterification rates. A suitable activation temperature is from about 40° to 50° C.

Following the activation period, the slurry is heated to raise the temperature of the mass to its boiling point. The heat up time can vary, e.g., from 10 to 100 minutes, with enough time provided to maintain a safe operation and also allow for some self heating depending on the degree of activation of the starch. After heat up to reflux, a reaction hold period is observed during which both esterification and crosslinking takes place. The reflux temperature is defined by the composition of the reaction mass and the pressure in the kettle. Typical reactions using acetic anhydride will initially reflux at about 124° to 126° C. and fall to about 117° to 119° C. as the reaction proceeds and acetic anhydride is consumed and acetic acid is produced. The observation of reaction temperature is an effective way to monitor the progress of the esterification reaction. Shortly after reflux is achieved, the degree of esterification of the starch will be high enough to cause the starch ester to gain solubility in the mixture and the mass will turn from a slurry to a clear paste. The amount of hold time generally needed to achieve 95%+reaction efficiency of the anhydride is about 60 to 180 minutes with longer hold times tending to degrade the paste.

After the reaction hold period at reflux, the formed paste is diluted with carboxylic acid and water. This is accomplished by cooling the reaction paste to about 100° C. and adding carboxylic acid depending on the viscosity of the system. Generally the higher the amylopectin content of the base starch, the more dilution is necessary to maintain mixability but this will vary depending on the particular system involved. When high amylose corn starch is used, the amount of carboxylic acid needed to dilute the viscosity of the paste is about 50 to 200% of the weight of the starting starch (as is basis) with the preferred amount being 150%. The amount of dilution will have a downstream influence on the particle size of the precipitated product when the paste is added to water during the purification and recovery process.

Following the carboxylic acid dilution, the reaction mass is cooled to 50° to 60° C. and water is slowly added to the paste. The water serves several purposes. First, it destroys any residual anhydride that failed to react with starch, it further dilutes the viscosity of the system for better mixability and pumpability and finally, the amount of dilution water added to the paste is the major controlling factor in defining the particle size of the precipitated particle when the paste is added to water. The amount of water added to the paste will vary from 50 to 400% by weight based on the original starch used. Lower or higher amounts of water will result in larger or smaller particle and either cause pumping problems or difficulty with filtering.

After the water dilution, the wet paste is ready for isolation, purification and drying. An efficient method of isolation is to pump the wet paste into rapidly agitating water. This causes an immediate precipitation of the starch ester. As noted above, there is excellent control over the particle size of the resultant precipitated starch ester by varying the diluents, the intensity of the agitation and the paste addition rate. After the paste is pumped into the water and the precipitation occurs, various methods of purification known to one skilled in the art can be used. Such methods include batch washing, continuous washing and counter current washing. This purification is done to remove residual carboxylic acid that exists as an esterification by-product. The purified product is then isolated and dried using standard starch processing technology.

The following examples will further illustrate the embodiments of this invention. In these examples all parts are given by weight and all temperatures in degrees Celsius unless otherwise noted.

EXAMPLE 1

Into a 2 gallon Pfaudler glasslined reaction vessel was charged 1,000 g Hylon® VII starch (a high amylose corn starch having about 70% amylose content; a product of National Starch and Chemical Company), 2,500 g acetic anhydride and 5.0 g of adipic acid. To this agitated slurry was added 100 g of 50% aqueous sodium hydroxide solution dropwise over 30 minutes at a temperature not exceeding 50° C. The activated slurry was then agitated for an additional 30 minutes at 30° to 50° C. Heat was applied to the reactor jacket and the slurry temperature was raised to 124° C. and held for 1.5 hours. During the hold, the reflux temperature of the resultant starch solution fell to 118° C. as acetic anhydride was converted to acetic acid. The reaction mixture was lowered to 100° C. and 1,500 g acetic acid was added to the reactor to lower the solution viscosity. The reaction mixture was cooled to 50° to 60° C. and 2,000 g water was added over 1 to 2 hours. The resultant diluted solution was discharged from the 2 gallon reactor and slowly added to 3 gallon of agitated, cold water in a 5 gallon plastic pail. The starch acetate precipitated to rice-sized particles and was resuspended in fresh water 4 times to remove residual acetic acid and sodium acetate. The product was isolated by filtration and dried in a forced draft oven at 60° C. overnight to yield 1,355 g of Hylon VII acetate. Physical and application testing results appear in Tables I and II below. This product demonstrates an increase in strength and elongation properties at 90% relative humidity compared to the control made without adipic acid and shown below in Example 2.

EXAMPLE 2 (COMPARATIVE CONTROL)

The same procedure and formula as set forth in Example 1 were followed except no adipic acid was added to the initial charge of Hylon VII and acetic anhydride. All other steps were the same as Example 1. Physical and application testing results appear in Tables I and II below.

EXAMPLE 3

Into a 100 gallon Pfaudler glasslined reaction vessel was added 100 lbs. Hylon VII starch, 250 lbs. acetic anhydride and 2 lbs. of adipic acid. To this agitated slurry was added 10 lbs. of 50% aqueous sodium hydroxide solution over 30 minutes at a temperature not exceeding 50° C. The activated slurry was then agitated for 30 minutes at 30° to 50° C. Heat was applied to the reactor jacket and the temperature was raised to 125° C. and held for 2 hours. During the hold, the reflux temperature of the vapor off the reaction mixture fell from 125° C. to 118° C. as acetic anhydride was consumed and acetic acid was made. The Hylon VII acetate solution temperature was lowered to 100° C. and 150 lbs. acetic acid was added to the reactor to lower the viscosity of the solution. The reaction mixture was then cooled to 50° to 60° C. and 200 lbs. water was slow added to the reactor over 1 to 2 hours. The resultant diluted solution was transferred into a 400 gallon mix tank containing 1,200 lbs. of agitating, cold water. Under these conditions the starch acetate precipitated into rice sized particles. The particles were centrifuged and resuspended in fresh water until the pH of the slurry was greater than 5. The product was tray dried for 16 hours at 60° C. to yield 125 lbs. of white, free-flowing coarse powder. The powder was ground through a 0.5 mm screen in a hammer mill. Physical and application testing results appear in Tables I and III. The term FP as used in the tables means Final Product. All the viscosities as shown in these tables and as carried out in this and other examples were determined using a Brookfield Cone and Plate Viscometer at 25° C. with Spindle #40. The dry products were dissolved in 80% acetic acid in water. The strength and modulus at 90% relative humidity are increased compared to the control shown below in Example 4.

EXAMPLE 4 (COMPARATIVE CONTROL)

The same procedure and formula as set forth in Example 3 were used except no adipic acid was added to the initial charge of Hylon VII starch and acetic anhydride. All other steps were the same as Example 3. Physical and application testing results appear in Tables I and III.

TABLE I

| | | Physical Properties | | | |
|---|---|---|---|---|---|
| Example | % Adipic on Starch | Viscosity of Dope | Viscosity of Dry FP 5% Solids | Viscosity of Dry FP 10% Solids | Degree of Substitution |
| 1 | 0.5 | 24700 cP | | | 2.25 |
| 2 | 0 | 9200 cP | | | 2.32 |
| 3 | 2 | 32560 cP | 197 cP | 2460 cP | 2.65 |
| 4 | 0 | 8000 cP | 95 cP | 865 cP | 2.36 |

TABLE II

| Application Properties - Tensile Strength (kPSI) and % Elongation | | | | | |
|---|---|---|---|---|---|
| | @ 10% Relative Humidity | | @ 50% Relative Humidity | | @ 90% Relative Humidity |
| Example | Str. | Elong. | Str. | Elong. | Str. | Elong. |
| 1 | 4.3 | 1.40 | 3.9 | 2.8 | 2.65 | 7.3 |
| 2 | 3.4 | 0.87 | 4.0 | 2.0 | 1.9 | 1.3 |

The above results were generated by compression molding a mixture of the Hylon VII starch acetate with 30% triacetin based on starch, then aging the resultant bars at the stated humidities for 14 days before Instron testing.

TABLE III

| Application Properties - Tensile Strength (kPSI) and Young's Modulus (kPSI) | | | | | |
|---|---|---|---|---|---|
| | @ 10% Relative Humidity | | @ 50% Relative Humidity | | @ 90% Relative Humidity |
| Example | Str. | Mod. | Str. | Mod. | Str. | Mod. |
| 3 | 4.4 | 205 | 3.4 | 160 | 1.4 | 803 |
| 4 | 4.6 | 250 | 3.5 | 210 | 0.8 | 50 |

The above data was generated by injection molding a mixture of Hylon VII starch acetate made as described in the stated example with 30% triacetin based on starch, then aging the resultant bars at the stated humidities for 14 days before testing.

EXAMPLE 5

The same procedure and formula as set forth in Example 2 were followed except 10.0 g benzophenone tetra carboxylic acid dianhydride (BTDA) were added with the 1,500 g acetic acid at 100° C., employed to lower the solution viscosity. After a 10 minute hold at 100° C., the reaction mixture was cooled to 50° to 60° C. and 2,500 g of dilution water was added. All other steps were the same as Example 2, Physical testing results appear in Table IV.

EXAMPLE 6

Into a 2 gallon Pfaudler glass lined reaction vessel was charged 750 g Hylon VII starch, 2,625 g propionic anhydride and 15 g adipic acid. To this agitated slurry was added 150 g of 45% aqueous potassium hydroxide solution dropwise over 30 minutes at 30° to 50° C. The activated slurry was then agitated 52 minutes at 30° to 50° C. Heat was applied to the rector jacket and the temperature of the slurry was raised to 141° C. where a mild reflux was observed. The reaction mixture was held at reflux for 2 hours then lowered to 70° to 80° C. and 940 g water was added to dilute the Hylon VII propionate solution. The solution was discharged from the reaction vessel and slowly added to 3 gallons of agitated, cold water in a 5 gallon plastic pail. The starch propionate precipitated in the water to coarse particles that were easily filtered and resuspended in fresh water until the pH of the slurry was greater than 5. The final isolation was done by vacuum filtration and the wet product cake was dried in a forced draft oven at 60° C. for 16 hours to yield 751 g of Hylon VII propionate. Physical testing results appear in Table IV.

EXAMPLE 7 (COMPARATIVE CONTROL)

The same procedure and formula as set forth in Example 6 were followed except no adipic acid was added to the initial charge of Hylon VII and propionic anhydride. All other steps were the same as Example 6. Physical testing results appear in Table IV.

TABLE IV

| Physical Properties of Examples 5 to 7 | | | | | |
|---|---|---|---|---|---|
| Example | BTDA % | Adipic Acid % | Viscosity of Dry FP 5% Solids | Viscosity of Dry FP 10% Solids | Degree of Substitution |
| 5 | 2 | 0 | 116 cP | 1220 cP | 2.32 |
| 6 | 0 | 2 | 112 cP | 730 cP | 2.50 |
| 7 | 0 | 0 | 8 cP | 47 cP | 2.70 |

All the viscosities shown above were determined by dissolving the dry product in 80% acetic acid in water and using a Brookfield Cone & Plate Viscometer @25° C. with Spindle #40.

What is claimed is:

1. A process for preparing crosslinked starch esters having a degree of substitution (DS) of about 1.3 to 2.7 comprising:
   a) slurrying starch in a monocarboxylic acid anhydride selected from anhydrides having carboxylic groups of 2 to 4 carbon atoms;
   b) adding a polyfunctional acid or anhydride to the above formed slurry, wherein said polyfunctional acid is selected from the group consisting of polycarboxylic acids having one of the following formulas:

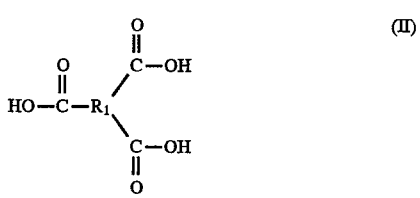

wherein R is selected from the group consisting of alkylene, unsaturated alkylene, bis alkylene ether, cycloalkylene and arylene containing from 1 to 42 carbon atoms; and $R_1$ is selected from the group consisting of trivalent paraffin radicals, and trivalent aromatic hydrocarbon radicals containing from 6 to 20 carbon atoms.

and said polyfunctional anhydride is selected from the group of anhydrides having the following general formula:

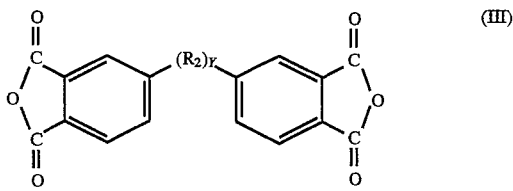
(III)

wherein $R_2$ is a divalent organic group, —O—, —S—, $SO_2$, or

and y is 0 or 1;

c) activating the slurry by the addition of aqueous caustic solution;

d) heating the slurry to its boiling point and holding until greater than about 95% conversion of the monoanhydride is reached and a crosslinked starch paste is formed; and e) isolating and recovering the crosslinked starch ester product.

2. The process of claim 1 wherein the monocarboxylic acid anhydride is selected from the group consisting of acetic anhydride, propionic anhydride and butyric anhydride and mixtures thereof.

3. The process of claim 1 wherein the monocarboxylic acid anhydride is used in an amount of from about 1.5 to 3.0 parts per part of starch by weight.

4. The process of claim 1 wherein the polyfunctional acid or anhydride is used in an amount of 0.001 to 5% by weight based on the dry weight of starch.

5. The process of claim 4 when the divalent organic group in the polyfunctional anhydride is selected from the group consisting of alkylene, unsaturated alkylene, bis alkylene ether, cycloalkylene and arylene and contains between 1 to 12 carbon atoms.

6. The process of claim 4 wherein the polyfunctional acid is selected from the group consisting of malonic acid, succinic acid, glutaric acid, adipic acid, pimelic acid, suberic acid, azelaic acid, sebacic, fumaric, terepthalic acid and oleic acid dimer acid and mixtures thereof.

7. The process of claim 4 wherein the polyfunctional acid anhydride is selected from the group consisting of benzophenone tetracarboxylic acid dianhydride, hexafluoroisopropyl bis (phthalic anhydride) pyromelletic dianhydride, sulfide (bis (phthalic anhydride) and biphenyl dianhydride and mixtures thereof.

8. The process of claim 1 wherein the starch is activated with about 3 to 10% caustic by weight based on the dry weight of starch.

9. The process of claim 8 wherein the caustic is selected from the group consisting of sodium hydroxide or potassium hydroxide.

10. The process of claim 1 wherein the starch is selected from the group consisting of corn, waxy corn, high amylose corn, tapioca and potato starch.

11. The process of claim 10 wherein the starch has a moisture content of about 7 to 14% by weight based on the dry weight of starch.

12. The process of claim 11 wherein the temperature during caustic addition is from about 20° to 50° C.

13. The process of claim 1 wherein the activation temperature is from about 40° to 50° C.

14. The process of claim 3 wherein the polyfunctional acid or anhydride is used in an amount of 0.001 to 5% by weight based on the dry weight of starch and the starch is activated with about 3 to 10% by weight caustic based on the dry weight of starch.

15. The process of claim 1 wherein the crosslinking is carried out by adding the polyfunctional anhydride to the slurry during the starch esterification with monocarboxylic acid anhydride or after the esterification is completed.

16. The process of claim 1 wherein the crosslinking is carried out by adding the polyfunctional acid to the slurry before or during the heating of the slurry.

17. The process of claim 1 wherein the starch ester has a DS of about 1.5 to 2.4.

18. A biodegradable, high humidity resistant crosslinked starch ester having a degree of substitution (DS) of about 1.3 to 2.7 which is prepared by:

a) slurrying starch in a monocarboxylic acid anhydride selected from anhydrides having carboxylic groups of 2 to 4 carbon atoms;

b) adding a polyfunctional acid or anhydride to the above formed slurry, wherein said polyfunctional acid is selected from the group consisting of polycarboxylic acids having one of the following formulas:

(I)

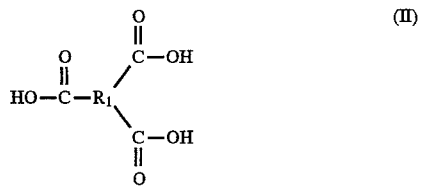
(II)

wherein R is selected from the group consisting of alkylene, unsaturated alkylene, bis alkylene ether, cycloalkylene and arylene containing from 1 to 42 carbon atoms; and $R_1$ is selected from the group consisting of trivalent paraffin radicals, and trivalent aromatic hydrocarbon radicals containing from 6 to 20 carbon atoms.

and said polyfunctional anhydride is selected from the group of anhydrides having the following general formula

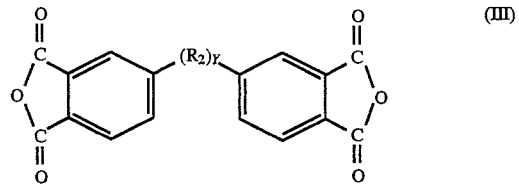
(III)

wherein $R_2$ is a divalent organic group, —O—, —S—, $SO_2$, or

and y is 0 or 1;

c) activating the slurry by the addition of aqueous caustic solution;

d) heating the slurry to its boiling point and holding until greater than about 95% conversion of the monoanhydride is reached and a crosslinked starch paste is formed; and e) isolating and recovering the crosslinked starch ester product.

19. The biodegradable, high humidity resistant crosslinked starch ester of claim 18 wherein the polyfunctional acid or polyfunctional anhydride is used in an amount of 0.001 to 5% by weight based on the dry weight of starch and the starch is activated with about 3 to 10% by weight caustic based on the dry weight of starch.

* * * * *